United States Patent
Sato et al.

(10) Patent No.: US 6,817,786 B2
(45) Date of Patent: Nov. 16, 2004

(54) FUSION SPLICING METHOD AND DEVICE FOR OPTICAL FIBERS

(75) Inventors: Hiroshi Sato, Chiba (JP); Hiroshi Sugawara, Chiba (JP); Sachie Morita, Chiba (JP); Takeshi Sato, Chiba (JP)

(73) Assignee: Fujikura Ltd., Tokyo (JP)

( * ) Notice: Subject to any disclaimer, the term of this patent is extended or adjusted under 35 U.S.C. 154(b) by 5 days.

(21) Appl. No.: 10/216,362

(22) Filed: Aug. 12, 2002

(65) Prior Publication Data

US 2003/0049001 A1 Mar. 13, 2003

(30) Foreign Application Priority Data

Sep. 7, 2001 (JP) ........................................ 2001-271168

(51) Int. Cl.[7] .............................................. G02B 6/255
(52) U.S. Cl. ........................ 385/96; 219/383; 385/134; 385/137
(58) Field of Search .......................... 385/96, 134, 147, 385/114; 219/124.1, 124, 139, 383, 200

(56) References Cited

U.S. PATENT DOCUMENTS

| | | | | |
|---|---|---|---|---|
| 2,266,239 A | * | 12/1941 | Nielsen ...................... | 219/139 |
| 4,049,414 A | * | 9/1977 | Smith .......................... | 65/407 |
| 4,237,365 A | * | 12/1980 | Lambros et al. ............. | 219/139 |
| 5,285,516 A | * | 2/1994 | Wong .......................... | 385/140 |
| 5,296,679 A | * | 3/1994 | Suzuki et al. ............... | 219/383 |
| 6,097,426 A | * | 8/2000 | Esmaeili ..................... | 348/90 |
| 2003/0021554 A1 | * | 1/2003 | Suzuki ........................ | 385/96 |

FOREIGN PATENT DOCUMENTS

| | | |
|---|---|---|
| JP | 1-54683 | 11/1989 |
| JP | 5-45607 | 6/1993 |

* cited by examiner

Primary Examiner—Edward J. Glick
Assistant Examiner—Krystyna Suchecki
(74) Attorney, Agent, or Firm—Oblon, Spivak, McClelland, Maier & Neustadt, P.C.

(57) ABSTRACT

In a fusion splicing method and device for optical fibers, bare fibers (f) of ribbon optical fibers "F" to be spliced together are arranged, in opposite direction to each other, on a fiber setup stage (30). An interval of a pair of the discharge electrode rods (10,20) is optionally changed according to the fiber number of the bare fibers "f" of the ribbon optical fiber "F" so that all of the bare fibers "f" are set into a uniform temperature area in a discharge area, and an optimum fusion splicing process is performed according to the fiber number of the bare fibers "f".

11 Claims, 6 Drawing Sheets

BARE FIBERS "f"

DISCHARGE AREA 3

DISCHARGE ELECTRODE ROD 10
DISCHARGE ELECTRODE ROD 20
31
31
30

10 (20)
ELECTRODE HOLDER 32
30
V-GROOVE 31

FUSION SPLICING METHOD AND DEVICE FOR OPTICAL FIBERS

CROSS-REFERENCE TO RELATED APPLICATION

This application is based upon and claims the benefit of priority from the prior Japanese Patent Application No.P2001-271168, filed Sep. 7, 2001; the entire contents of which are incorporated herein by reference.

BACKGROUND OF THE INVENTION

1. Field of the Invention

The present invention relates to a fusion splicing method and device for optical fibers, specifically, ribbon optical fibers (having a tape-shaped structure) capable of obtaining a good splice state of the ribbon optical fibers by controlling the interval between discharge electrode rods according to the number of the bare fibers in the fusing and splicing process.

2. Description of the Related Art

In a fusing splicing process for optical fibers, specifically, ribbon optical fibers having a tape-shaped structure, the bare fibers (which are distal ends of the optical fibers, each bare fiber is made up of a core and a cladding where a coated material has been eliminated) to be spliced together are arranged and aligned, in opposite direction to each other, in V-grooves formed on a V-groove block in a fiber setup stage. Then, an aerial discharge (arc discharge) is generated between a pair of electrode rods. The bare fibers of the ribbon optical fibers are thereby fused and spliced together. This is called a fusing splicing method.

In a fusion splicing device performing such a general fusion splicing process of a related art, the interval between a pair of the discharge electrode rods is fixed. That is, the interval between the discharge electrode rods is set to a constant interval.

In order to accommodate various ribbon optical fibers having a different number of optical fibers, for example, as shown in FIG. 1, the interval between the discharge electrode rods 1 and 2 is set to an optimum length by which a discharge area has an optimum distribution for the optical fibers during an aerial discharge based on various parameters such as a distance δ a from the discharge electrode rod 1 to the left side of the bare fibers "f", a distance δ b from the discharge electrode rod 2 to the right side of the bare fibers "f", and an offset value δ c between the height of a center position of each of the electrode rods 1 and 2 and the center position of each bare fiber "f".

Following is the reason why it is necessary to perform the control described above. For example, as shown in FIG. 2, when an arc discharge occurs between a pair of the discharge electrode rods 1 and 2 in the atmosphere under a normal condition, the distribution of temperature in the discharge area 3 is symmetric between the upper and lower halves, and a rapid temperature change occurs around the discharge electrode rods 1 and 2. On the contrary, an area, which is separated in position from a pair of the discharge electrode rods 1 and 2, has a relatively uniform and wide temperature area.

In an actual fusion splicing process, it is necessary to control that a relatively uniform and wide temperature area is detected according to the number of ribbon optical fibers to be spliced together, and all of the bare fibers of the ribbon optical fibers are then set in this uniform temperature area in order to heat all of the bare fibers at the uniform temperature.

However, when the number of the optical fibers (fiber number) is increased, the width of the ribbon optical fiber of a tape-shaped structure is increased. Accordingly, it becomes difficult to detect the uniform temperature area in the discharge area 3 generated between the electrode rods 1 and 2, and further to set all of the bare fibers "f" in this uniform temperature area in order to heat them at the uniform temperature.

For example, when the number of the bare fibers is within a range of 1–12, even if the electrode rods 1 and 2 whose position is fixed are used, it is possible to set all of the bare fibers in the discharge area 3 caused between the discharge electrode rods 1 and 2 by setting those parameters to optimum values. However, when the number of the bare fibers is within 13–18, and further within 19–24, it becomes difficult to heat all of the bare fibers at a uniform temperature.

That is, when the number of optical fibers is increased, it is necessary to increase an amount of heat obtained by the discharge according to the increasing of the number of the optical fibers, and also to increase an electric power for the discharge. However, it is difficult to set the optimum discharge power based on the number of the optical fibers.

In various fusion splicing devices of the related art, when the interval between the discharge electrode rods 1 and 2 is changed according to a ribbon optical fiber having the maximum number of the optical fibers, there is a drawback that it is difficult for a non-skilled operator to detect a shape of the distribution of the discharge area, to obtain the optimum discharge power by determining the optimum interval between the discharge electrode rods.

Further, there is a following drawback in the related art. Even if the fusion splicing device having a fixed interval between the discharge electrode rods is used, where this fixed interval corresponds to a ribbon optical fiber having the maximum fiber number, it becomes difficult to obtain a stable amount of heat to perform the splicing fusion process for ribbon optical fibers whose number of optical fibers is small.

SUMMARY OF THE INVENTION

Accordingly, an object of the present invention is, with due consideration to the drawbacks of the related technique, to provide a fusion splicing method and device for optical fibers in which an interval between discharge electrode rods is changeable, namely determined, according to the number of optical fibers of an optical fiber, specifically, a ribbon optical fiber. For example, according to various ranges of fiber numbers, that have been set in advance, the interval between the discharge electrode rods is controlled in order to generate the discharge area having the optimum discharge power. Thereby, it is possible to heat all of bare fibers of the ribbon optical fibers at a uniform temperature, and thereby to obtain a good splice state of all of the bare fibers of the ribbon optical fibers.

According to an embodiment, a fusion splicing method for optical fibers has following steps: arranging bare fibers of ribbon optical fibers to be spliced together, in opposite direction to each other, on a fiber setup stage; and performing a discharge between a pair of discharge electrode rods by changing an interval between a pair of the discharge electrode rods according to a fiber number of the ribbon optical fibers so that all of the bare fibers are set in a uniform temperature area in the discharge, and fusing and splicing the bare fibers together.

In addition, according to another embodiment, a fusion splicing device for optical fibers has a fiber setup stage on which ribbon optical fibers to be spliced together are arranged in opposite direction to each other, and a pair of discharge electrode rods for generating a discharge between them in order to fuse and splice the ribbon optical fibers arranged on the fiber setup stage. In the fusion splicing device, in order to set all of bare fibers of the ribbon optical fibers into a uniform temperature area in a discharge generated between the discharge electrode rods, one of or both the discharge electrode rods are shifted by a predetermined length according to a fiber number of the ribbon optical fibers, and the ribbon optical fibers are fused and spliced together based on the interval obtained between the discharge electrode rods.

Still further, according to another embodiment, a fusion splicing device for optical fibers has a fiber setup stage on which ribbon optical fibers to be spliced together are arranged in opposite direction to each other, and a plurality of discharge electrode rods of different lengths, each length corresponding to each fiber-number class of the ribbon optical fiber, where each fiber-number class being set corresponding to a fiber number of each ribbon optical fiber. In the fusion splicing device, one pair of the discharge electrode rods of different lengths is selected according to the fiber-number class corresponding to the fiber number of the ribbon optical fibers to be spliced together, and the fusion splicing process is performed by setting the optimum discharge interval by using the selected discharge electrode rods.

The above and other features and advantages of this invention and the manner of realizing them will become more apparent, and the invention itself will best be understood, from a study of the following description and attached claims, with reference had to the attached drawings showing some preferable embodiments of the invention.

DESCRIPTION OF THE PREFERRED EMBODIMENTS

Other features of this invention will become apparent through the following description of preferred embodiments which are given for illustration of the invention and are not intended to be limiting thereof.

Embodiments

Figure 1:
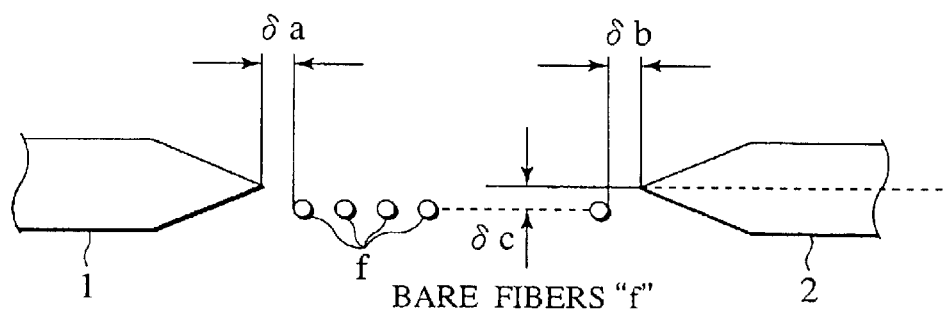
FIG. 1 is a diagram showing a schematic explanation for each parameter for use in a fusion splicing process for ribbon optical fibers.
Figure 2:
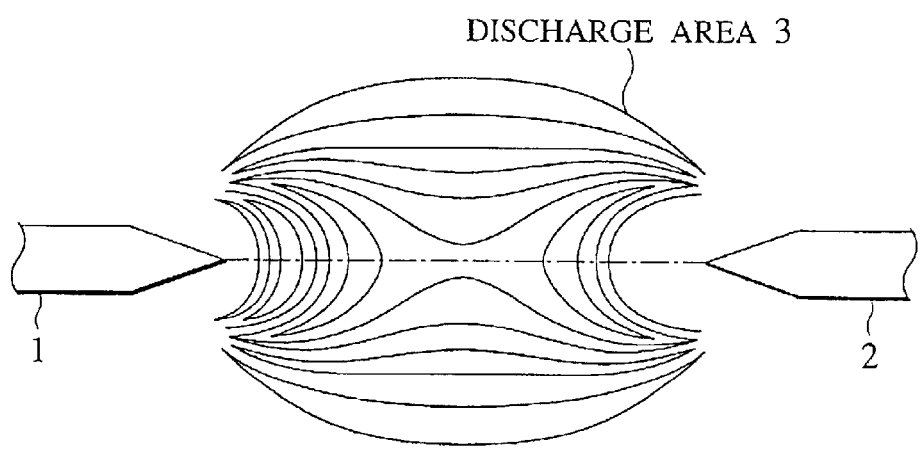
FIG. 2 is a schematic diagram showing a discharge area generated between discharge electrode rods of a related art.
Figure 3:
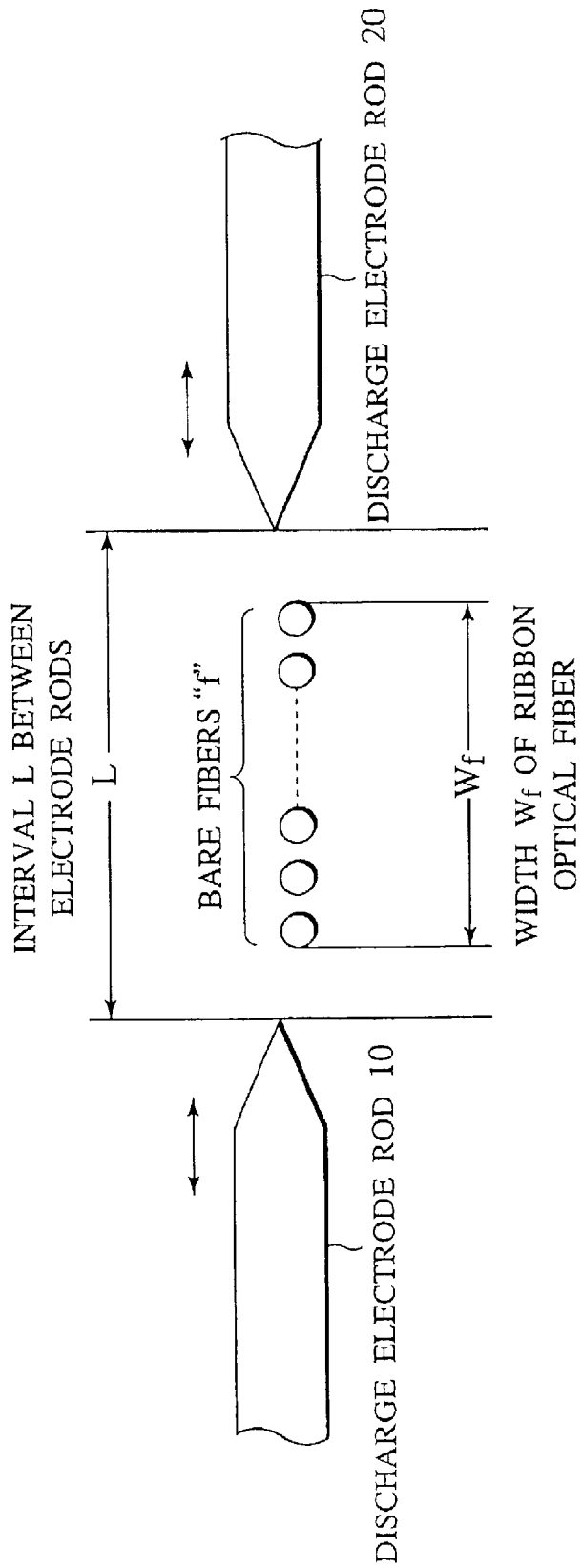
FIG. 3 is a diagram showing a schematic principle to perform a fusion splicing method for optical fibers according to the present invention.

FIG. 3 is a diagram showing a schematic principle to perform a fusion splicing method for optical fibers according to the present invention. In FIG. 3, the reference numbers 10 and 20 designate a pair of discharge electrode rods for generating an aerial discharge, the reference character "f" denotes a plurality of bare fibers (which are distal ends of the optical fibers, each bare fiber is made up of a core and a cladding where a coated material has been eliminated) in a ribbon optical fibers to be spliced together.

In the present invention, the interval L between the discharge electrode rods 10 and 20 is changed according to the width Wf of the bare fibers namely, the width Wf is a fiber width, corresponding to the number of bare fibers (fiber number) forming a ribbon optical fiber).

For example, when the fiber width Wf is narrow, the interval L between the discharge electrode rods becomes a small value. On the contrary, when the fiber width Wf become wide, the interval L is set to a large value.

However, the above described adjustment for the interval L between the discharge electrode rods 10 and 20 every changing the width Wf of optical fibers decreases a working efficiency and this manner needs a skilled operator.

In order to avoid this drawback, the fusion splicing method and device of the present invention performs as follows:

First, various ribbon optical fibers are classified in advance to several fiber-number classes according to the number of optical fibers (fiber numbers). Thereby, the optimum interval L between the discharge electrode rods for each ribbon optical fiber to be spliced is automatically determined according to the fiber-number classes.

For example, the classes about the fiber-number of optical fibers in a ribbon optical fiber are three fiber-number classes, the fiber-number of a range 1–12, the fiber-number of a range 13–18, and the fiber-number of a range 19–24. According to those fiber-number classes, the interval L between the discharge electrode rods 10 and 20 is set to three intervals, approximately 4.0±0.5 mm, approximately 5.4±0.5 mm, and approximately 6.8±0.5 mm. Those intervals have been determined according to actual experiments. By using those intervals, it is possible to obtain the optimum uniform temperature area in a discharge area during the fusion splicing process.

When the fiber number of optical fibers in a ribbon optical fiber is twelve, the fiber width Wf is approximately 2.875 mm. Similarly, when the fiber number is sixteen, the fiber width Wf is approximately 3.875 mm, and when the fiber number is twenty four, the fiber width Wf becomes approximately 5.875 mm.

Accordingly, when the fiber number of the optical fibers in the ribbon optical fiber is in the fiber-number class of the range 1–12, it is automatically determined that the interval L between the discharge electrode rods 10 and 20 is approximately 4.0±0.5 mm. Similarly, it is also automatically determined that other fiber-number classes of the ranges 13–18 and 19–24 take the intervals, approximately 5.4±0.5 mm, and approximately 6.8±0.5 mm, respectively.

Figure 4:
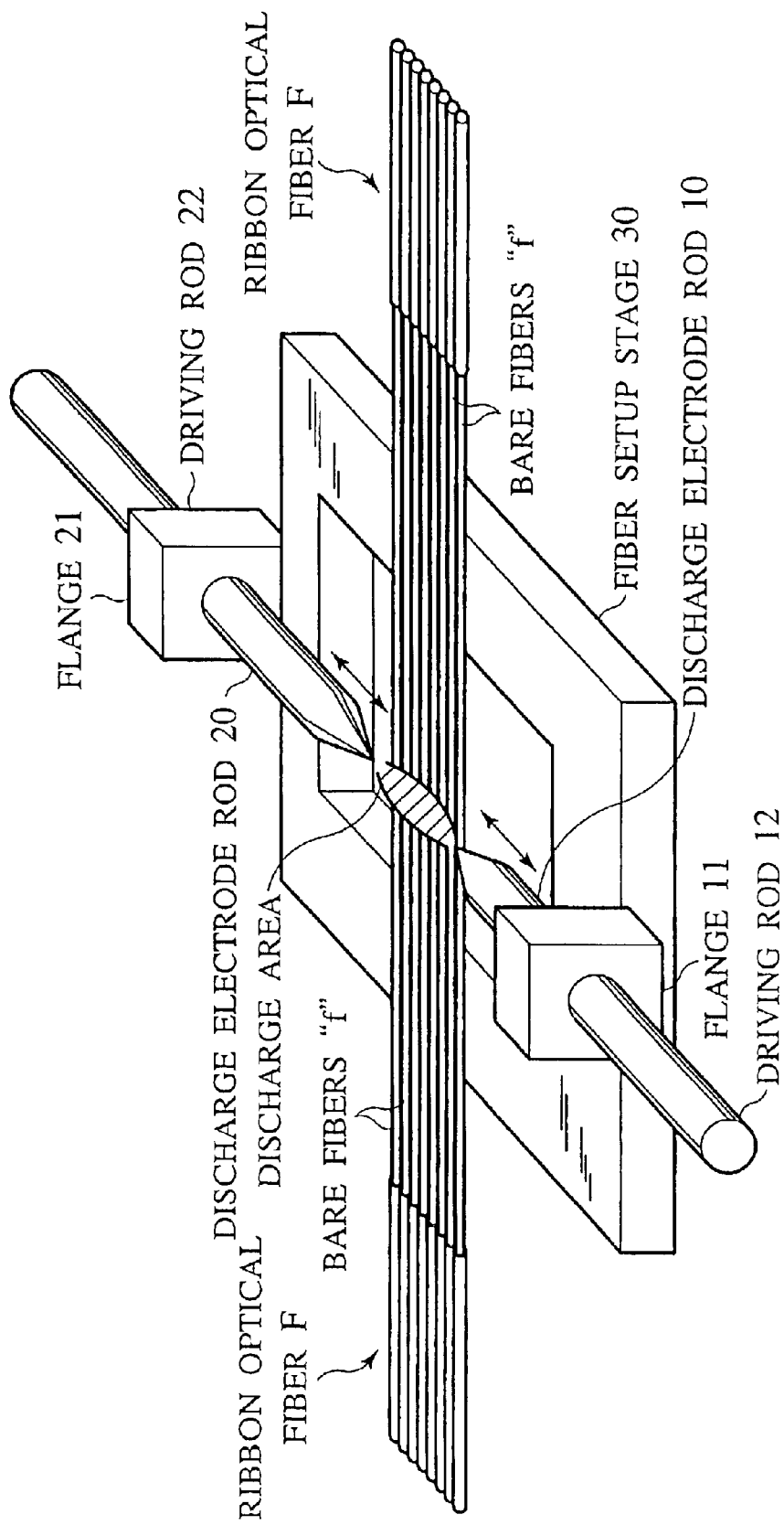
FIG. 4 is a schematic perspective diagram showing an example of a configuration of a fusion splicing device for optical fibers performing the fusion splicing method of the present invention.

FIG. 4 is a schematic perspective diagram showing a configuration of the fusion splicing device for optical fibers capable of changing the interval L between the discharge electrode rods 10 and 20 automatically.

The fusion splicing device shown in FIG. 4 basically comprises a fiber setup stage 30 and a pair of the discharge electrode rods 10 and 20. The fiber setup stage 30 (fiber holders are omitted here) is made up of a rectangle plate, on opposite upper surfaces of which a plurality of V-grooves are formed. In the V-grooves formed on the opposite upper surfaces, bare fibers "f" of the ribbon optical fibers to be spliced are arranged in opposite direction to each other. The discharge electrode rods 10 and 20 can be moved in a vertical direction opposed to the direction of the arrangement of the bare fibers.

In the configuration shown in FIG. 4, flanges 11 and 21 are mounted, as a type of positioning component, at the base sections of the discharge electrode rods 10 and 20. Further, driving rods 12 and 22 for driving the discharge electrode rods 10 and 20 are mounted at the rear portions of the flanges 11 and 21, for example.

Each of the driving rods 12 and 22 is driven by a driving source such as a motor, omitted from the diagrams, or through an operation lever, as a simple means easy to handle, connected to a linkage and the like which is operable by an operator.

Figure 5A:
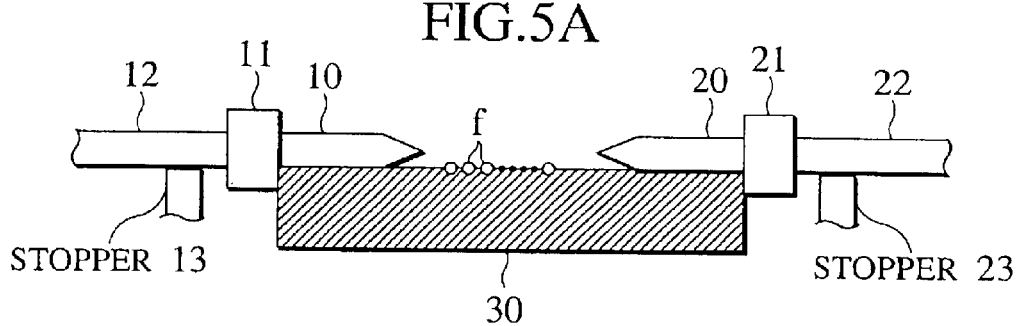
FIGS. 5A, 5B, and 5C are diagrams showing explanations for the relationship in position about various intervals between the discharge electrode rods in the fusion splicing device shown in FIG. 4.
Figure 5B:
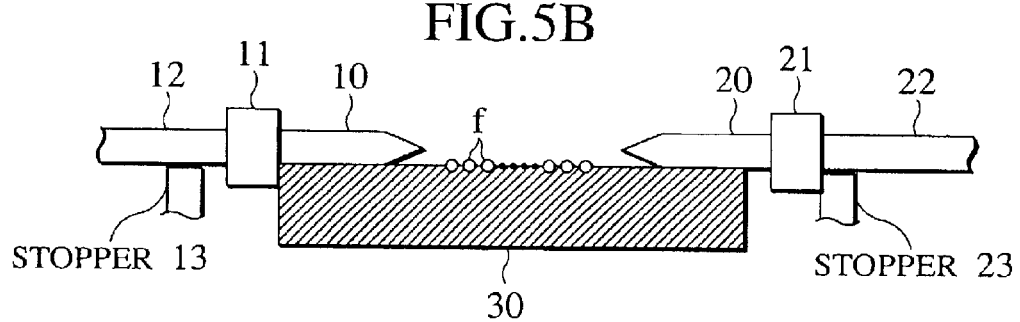
Figure 5C:
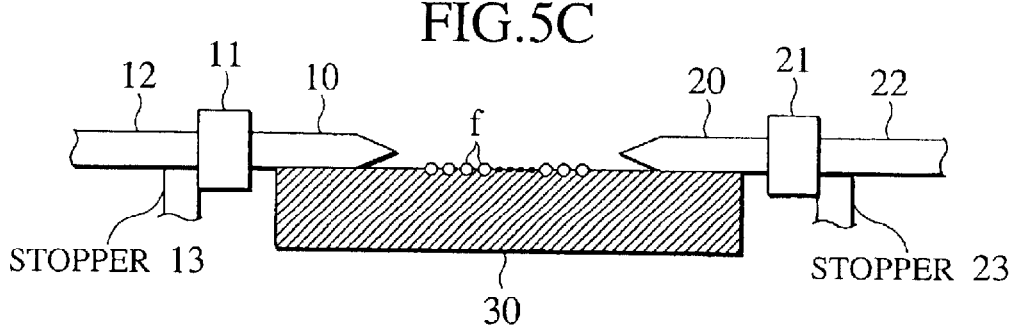

FIGS. 5A, 5B, and 5C are diagrams showing explanations of examples of positioning of various intervals between the discharge electrode rods in the fusion splicing device shown in FIG. 4.

First, when the fiber-number class of bare fibers is the fiber number of the range 1–12, as shown in FIG. 5A, the positioning is performed so that both the end portions of the fiber setup stage 30 are contacted to the flanges 11 and 21 of the discharge electrode rods 10 and 20. In this positioning manner shown in FIG. 5A, the interval L between the discharge electrode rods 10 and 20 is set to approximately 4.0±0.5 mm, as described above. That is, when the fiber number of the bare fibers in the ribbon optical fiber is within the range 1–12 and when an arc discharge is generated under the interval approximately 4.0±0.5 mm, it is possible to obtain the optimum distribution of the discharge area for the bare fibers in this number. This interval L between the discharge electrode rods 10 and 20 shown in FIG. 5A will be called to as a base interval.

Next, when the fiber-number class of bare fibers is the fiber number of the range 13–18, as shown in the right side of FIG. 5B, for example, only the discharge electrode rod 20 is shifted by a predetermined interval by shifting the flange 21 to a positioning stopper 23. Thus, it is sufficient to mount the positioning stopper 23 in order to control the interval L, that is, to control the back-positioning of the discharge electrode rod 20.

Thus, when the number of the bare fibers in the ribbon optical fiber is within the range 13–18 and when an arc discharge is generated under the interval of approximately 5.4±0.5 mm between the discharge electrode rods 10 and 20, it is possible to obtain the optimum distribution of the discharge area for the bare fibers within this fiber-number range, and thereby possible to heat, fuse and splice all of the bare fibers at an uniform temperature.

Further, when the fiber-number class of bare fibers is the fiber number of the range 19–24, as shown in the right side of FIG. 5C, for example, the discharge electrode rod 10 is also shifted by a predetermined interval so that the flange 11 is contacted to a positioning stopper 13, in addition to the state where the discharge electrode rod 20 of the right side is in the back position (under the state where the flange 21 is contacted to the positioning stopper 23). Thereby, the interval L between the discharge electrode rods 10 and 20 becomes approximately 6.8±0.5 mm.

Thus, it is sufficient to mount the positioning stopper 13 in order to control the interval L, that is, to control the back-positioning of the discharge electrode rod 10.

When the fiber number of the bare fibers in the ribbon optical fiber is within the fiber-number range 19–24 and when an arc discharge is generated under the interval of approximately 6.8±0.5 mm between the discharge electrode rods 10 and 20, it is possible to obtain the optimum distribution of the discharge area for the bare fibers within this fiber-number range.

Figure 6:
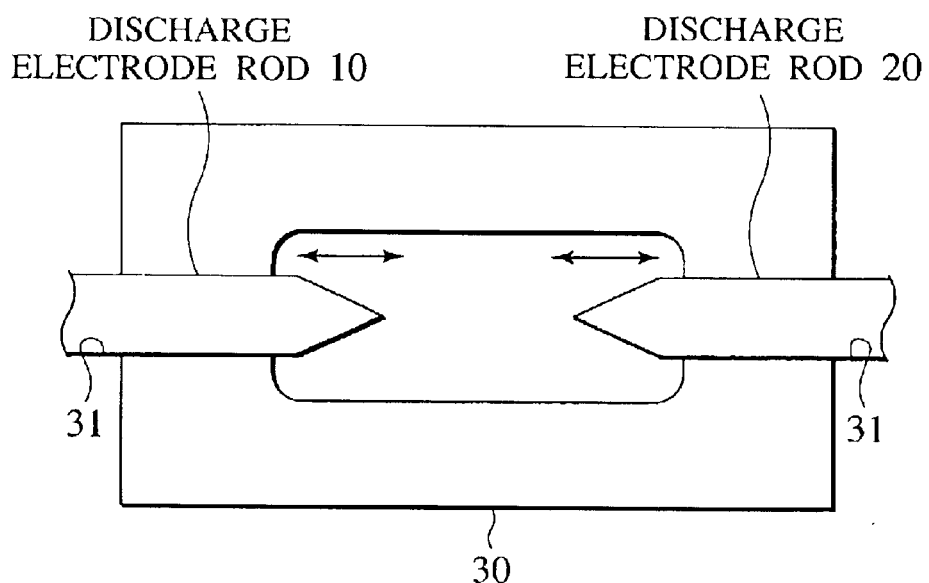
FIG. 6 is a plan view showing another schematic configuration of the fusion splicing device for optical fibers according to the present invention.
Figure 7:
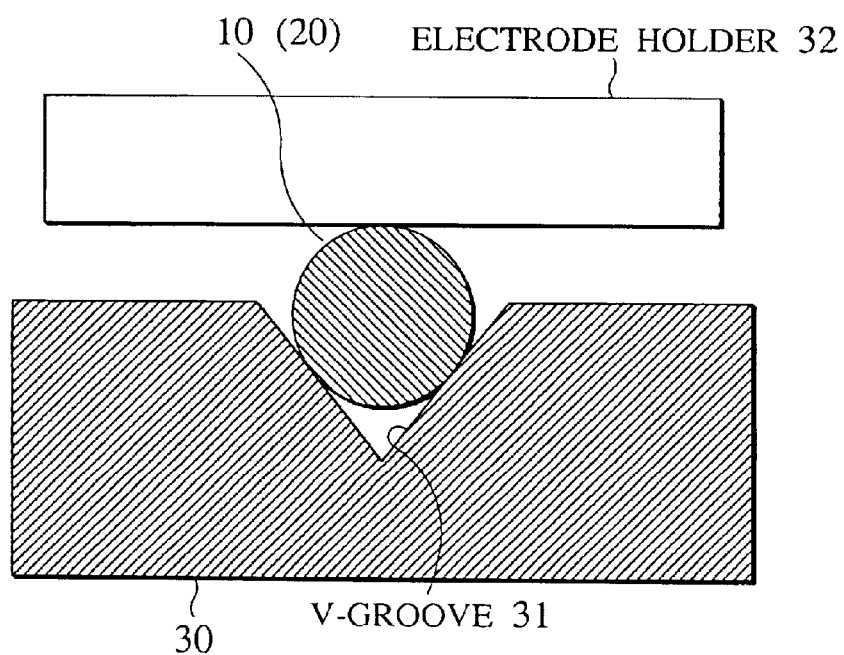
FIG. 7 is a partially vertical sectional diagram of the fusion splicing device shown in FIG. 6.

In order to shift the discharge electrode rods 10 and 20 at highly precisely, as shown in FIG. 6 and FIG. 7, it is preferred that a pair of guide grooves 31 for shifting both the discharge electrode rods 10 and 20 are mounted on the upper surface side of the fiber setup stage 30 (see FIG. 6). Further, it is preferred to mount electrode holders 32 for holding the discharge electrode rods 10 and 20, if necessary (see FIG. 7) in addition to the configuration shown in FIG. 6. Thus, the above configuration can shift both the discharge electrode rods 10 and 20 at high preciously under a stable state.

Figure 8:
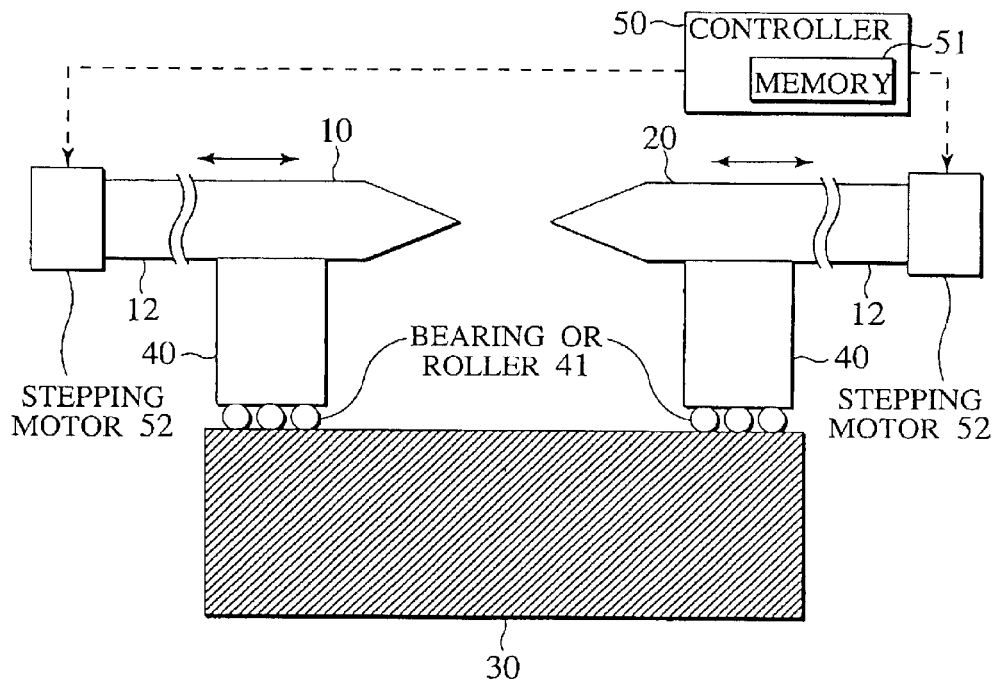
FIG. 8 is a sectional diagram showing another schematic configuration of the fusion splicing device for optical fibers according to the present invention.

For example, as shown in FIG. 8, it is possible to drive an infinite shifting of each of the discharge electrode rods 10 and 20 that are fixed to a slid chip 40 (or a block) having a shifting means 41 such as a bearing and a roller on the fiber setup stage 30.

In this case, it is possible to adjust the interval L between the discharge electrode rods accurately according to the number of optical fibers of each ribbon optical fiber regardless of the number class of the optical fibers.

For example, the optimum interval L corresponding to each fiber number is determined based on experiments in advance, and data items corresponding to the optimum intervals L are stored in a memory 51 in a controller 50 by which the amount of shifting of the discharge electrode rods is controlled (see FIG. 8).

For example, when an operator inputs the fiber number for ribbon optical fibers, to be spliced together, through an operation panel (not shown), the controller 50 then reads the data regarding the optimum interval L for the ribbon optical fibers from the memory 51. The controller 50 drives the stepping motor 52 based on the data read from the memory 51 in order to shift the driving rods 12 and 22. It is thereby possible to set the optimum interval L between the discharge electrode rods automatically for the ribbon optical fibers to be spliced together.

Figure 9:
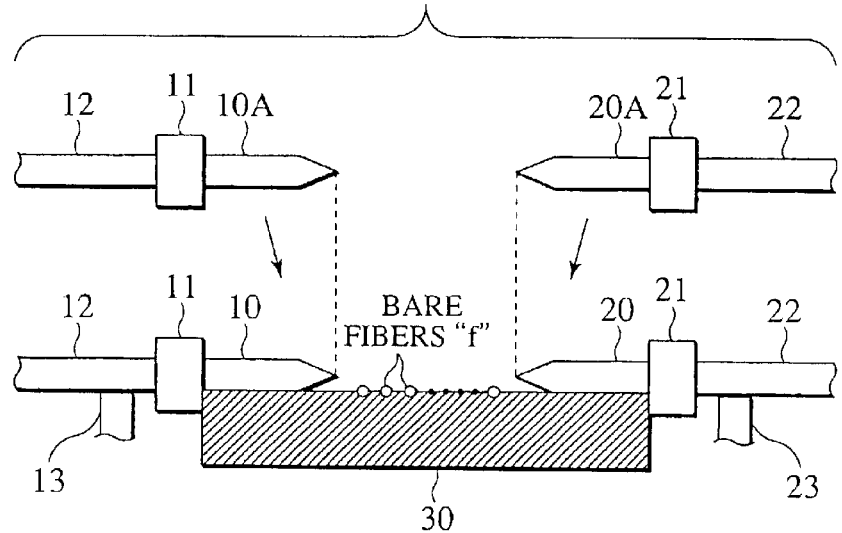
FIG. 9 is a sectional diagram showing another schematic configuration of the fusion splicing device for optical fibers according to the present invention.

In addition to the shifting manner for the discharge electrode rods 10 and 20 described above, for example, as shown in FIG. 9, there is another manner to change the interval L between the discharge electrode rods by switching one of the discharge electrode rods 10 and 20, or both the electrode rods 10 and 20 having different lengths corresponding to the fiber numbers of various ribbon optical fibers. This manner can also obtain the same effect.

It is easily possible to perform this switching manner of the length of the discharge electrode rod of different lengths by mounting an attachment section in the body of the fusion splicing device to optionally attach the flanges 11 and 21 to the discharge electrode rods 10 and 20. Under the situation where discharge electrodes of different lengths are prepared in advance, the discharge electrode rod is switched according to the fiber number of the ribbon optical fiber, so that it is possible to obtain the optimum interval L between the discharge electrode rods according to the fiber number.

That is, discharge electrode rods 10A and 20A of a longer length are prepared in advance, which are longer than the electrode rods 10 and 20 of a standard length, corresponding to the length of the back-position of the discharge electrode rods 10 and 20 shown in FIGS. 5A to 5C. When the discharge electrode rods 10 and 20 are switched to the electrode rods 10A and 20A, it is possible to obtain the same action and effect of the cases shown in FIGS. 5A to 5C in which the discharge electrode rods are actually shifted.

The kind of the length of the discharge electrode rods is not limited by the above case where the two kinds of the lengths are used. If many kinds of the lengths corresponding to various ribbon optical fibers having different lengths are prepared, it is possible to obtain the optimum interval L between the discharge electrode rods corresponding to various types of the ribbon optical fibers having many different fiber-numbers.

In the above embodiments, because the ribbon optical fibers F are set and clamped to the V-grooves in the fiber setup stage 30, the present invention is not limited by this configuration, for example, it is also possible to prepare a rectangle plate and a V-groove block having V-grooves, in different components, and to combine the V-groove block to the rectangle plate in use. This case can obtain the same effects of the embodiments described above.

Furthermore, in the embodiments described above, the optical fibers are spliced under the optimum condition in which the interval between the discharge electrode rods is changed according to the fiber number of the ribbon optical fibers to be spliced. That is, changing the interval between the discharge electrode rods means to change the voltage applied between both the discharge electrode rods. Therefore this means that the electric power applied between the discharge electrode rods is changed. In other words, the electric power to be applied between the discharge electrode rods is changed according to the fiber number of the ribbon optical fibers.

As set forth in detail, according to the fusion splicing method and device of the present invention, because the interval between the discharge electrode rods is changed according to the fiber number of ribbon optical fibers to be spliced, it is possible to generate a discharge area between the discharge electrode rods with an optimum discharge power. Thereby, it is possible to heat all of bare fibers of the ribbon optical fibers with a uniform temperature. As a result, it is possible to obtain all of the bare fibers in a stable and high reliability fused-spliced state without any variation in spliced state.

In addition, when several fiber-number classes are set according to the fiber number of a ribbon optical fiber, and when one of the fiber-number classes is selected and the interval between the discharge electrode rods is changed according to the fiber-number class selected, it is possible to obtain the optimum discharge area corresponding to the fiber number by the fusion splicing device of a simple configuration.

Furthermore, when the shifting manner for shifting one of or both of the discharge electrode rods by a predetermined length is adapted in order to change the interval between the discharge electrode rods, it is possible to obtain an optimum discharge area only by using a pair of the discharge electrode rods of a fixed length. It is thereby possible to provide the fusion splicing device of a relatively low manufacturing cost without increasing the size of the device.

Moreover, because it is not necessary to mount any magnetic field generation means for controlling the discharge area around the discharge electrode rods, there happens no erroneous discharge.

Further, when the guide grooves for a pair of the discharge electrode rods are formed in the fiber setup stage in the method of shifting the discharge electrode rods, it is possible to shift the discharge electrode rods to a predetermined position under a simple configuration with a stable state and with a high precision. Of course, it is possible to effectively prevent occurrence of positioning error between the bare fibers and the discharge electrode rods after the shifting process.

Furthermore, according to the present invention, a plurality of discharge electrode rods of different lengths are prepared in advance for the changing of the interval between the discharge electrode rods and the discharge electrode rods are changed according to the fiber number of ribbon optical fibers to be spliced. Although the fiber number of the discharge electrode rods is increased, it is possible to achieve a drastic manufacturing costdown of the fusion splicing device because it is not necessary to incorporate a driving source such as a stepping motor and an operation lever including a link mechanism and the like.

All these and other modifications and alterations of the illustrated embodiments within the common knowledge of the specialists are intended in the foregoing disclosure. It is therefore appropriate that the invention be construed broadly and in a manner consistent with the fair meaning or proper scope of the subjoined claims.

What is claimed is:

1. A fusion splicing method for optical fibers comprising:
    arranging bare fibers of ribbon optical fibers to be spliced together opposite to each other on a fiber setup stage;
    performing a discharge between a pair of discharge electrode rods so as to fuse and splice the bare fibers together; and
    controlling an interval between the pair of the discharge electrode rods according to a fiber number of the ribbon optical fibers so that during the discharge step all of the bare fibers are set in a uniform temperature area.

2. The fusion splicing method according to claim 1, comprising the further steps of:
    setting fiber-number classes according to a fiber number of the ribbon optical fiber,
    selecting one of the fiber-number classes according to the fiber number of the ribbon optical fibers to be spliced together,
    controlling the interval between the discharge electrode rods according to the fiber-number class selected, and
    performing the fusion splicing process for the ribbon optical fibers.

3. The fusion splicing method according to claim 2, comprising the further steps of:
    selecting one of the fiber-number classes according to the fiber number of the ribbon optical fibers to be spliced together,
    setting the interval between the discharge electrode rods by using stoppers that are set according to the fiber-number class selected, and
    performing the fusion splicing process for the ribbon optical fibers.

4. The fusion splicing method according to claim 2, comprising the further steps of:
    selecting one of the fiber-number classes according to the fiber number of the ribbon optical fibers to be spliced together,
    selecting a pair of the discharge electrode rods, according to the fiber-number class selected, from a plurality of discharge electrode rods of different lengths that are prepared in advance, and
    performing the fusion splicing process for the ribbon optical fibers using the selected discharge electrode rods.

5. The fusion splicing method according to claim 2, wherein the fiber-number classes are three classes whose ranges are 1–12, 13–18, and 19–24 in fiber number, and the fusion splicing process is performed based on the three fiber-number classes.

6. The fusion splicing method according to claim 1, wherein an electric power to be applied to the discharge electrode rods in order to generate a discharge is changed according to the fiber number of the ribbon optical fibers to be spliced.

7. A fusion splicing device for optical fibers comprising:

a fiber setup stage on which ribbon optical fibers to be spliced together are arranged opposite to each other; and a pair of discharge electrode rods adapted to generate a discharge between them in order to fuse and splice the ribbon optical fibers arranged on the fiber setup stage, wherein in order to set all of bare fibers of the ribbon optical fibers into a uniform temperature area in a discharge generated between the discharge electrode rods, one of or both the discharge electrode rods are adapted to be shifted by a predetermined length according to a fiber number of the ribbon optical fibers, and the ribbon optical fibers are fused and spliced together based on the interval obtained between the discharge electrode rods.

8. The fusion splicing device for optical fibers according to claim 7, further comprising guide grooves through which a pair of the discharge electrode rods are shifted, formed in a predetermined direction in the fiber setup stage, and a pair of the discharge electrode rods are shifted according to the fiber number of the ribbon optical fibers by the predetermined length.

9. The fusion splicing device for optical fibers according to claim 7, wherein fiber-number classes are set according to the fiber number of the ribbon optical fibers, and the fusion splicing device further comprises stoppers for setting the interval between the discharge electrode rods corresponding to each fiber-number class, wherein one of the fiber-number classes is selected according to the fiber number of the ribbon optical fibers to be spliced together, and the interval between the discharge electrode rods is changed by using the stoppers corresponding to the selected fiber-number class, and the fusion splicing process is then performed.

10. The fusion splicing device for optical fibers according to claim 7, further comprising:

a shifting section for setting the interval between the discharge electrode rods into a predetermined length;

a memory for storing data items for shifting the discharge electrode rods by a predetermined length according to the fiber number of the ribbon optical fibers to be spliced together; and a controller for reading the data item stored in the memory corresponding to the fiber number of the ribbon optical fibers to be spliced together, and for controlling an amount of shifting by the shifting section according to the data item obtained.

11. A fusion splicing device for optical fibers comprising:

a fiber setup stage on which ribbon optical fibers to be spliced together are arranged opposite to each other; and a plurality of discharge electrode rods of different lengths, each length corresponding to each fiber-number class of the ribbon optical fiber, where each fiber-number class is set corresponding to a fiber number of each ribbon optical fiber, wherein one pair of the discharge electrode rods of different lengths is selected according to the fiber-number class corresponding to the fiber number of the ribbon optical fibers to be spliced together, and the fusion splicing process is performed by setting the optimum discharge interval by using the selected discharge electrode rods.

* * * * *